United States Patent
Xi et al.

(10) Patent No.: US 10,280,249 B2
(45) Date of Patent: May 7, 2019

(54) POLYURETHANE COMPOSITE ELEMENTS AND PROCESSES FOR PRODUCING THE SAME

(71) Applicant: Covestro Deutschland AG, Leverkusen (DE)

(72) Inventors: Qiang Xi, Shanghai (CN); Chunlei Zheng, Shanghai (CN)

(73) Assignee: Covestro Deutschland AG, Leverkusen (DE)

( * ) Notice: Subject to any disclaimer, the term of this patent is extended or adjusted under 35 U.S.C. 154(b) by 203 days.

(21) Appl. No.: 15/260,605

(22) Filed: Sep. 9, 2016

(65) Prior Publication Data

US 2017/0073455 A1    Mar. 16, 2017

(30) Foreign Application Priority Data

Sep. 15, 2015    (CN) .......................... 2015 1 0613870

(51) Int. Cl.
| | | |
|---|---|---|
| *C08G 18/48* | (2006.01) |
| *C08G 18/72* | (2006.01) |
| *C08J 9/00* | (2006.01) |
| *C08G 18/76* | (2006.01) |

(52) U.S. Cl.
CPC ............. *C08G 18/48* (2013.01); *C08G 18/72* (2013.01); *C08G 18/7664* (2013.01); *C08J 9/0042* (2013.01); *C08J 2205/052* (2013.01); *C08J 2375/08* (2013.01)

(58) Field of Classification Search
CPC .... C08G 18/48; C08G 18/72; C08G 18/7664; C08J 9/0042; C08J 2205/052; C08J 2375/08
See application file for complete search history.

(56) References Cited

U.S. PATENT DOCUMENTS

| | | | |
|---|---|---|---|
| 3,334,557 A | * | 8/1967 | Fitzgibbon |
| 5,248,703 A | * | 9/1993 | Krueger et al. |
| 7,619,014 B2 | * | 11/2009 | Schilling et al. |
| 2011/0072756 A1 | * | 3/2011 | Collins |

* cited by examiner

*Primary Examiner* — John M Cooney
(74) *Attorney, Agent, or Firm* — K&L Gates LLP

(57) ABSTRACT

A polyurethane composite element has one or more gaps containing a polyurethane foam. The polyurethane foam has a density of 16-40 kg/m$^3$ and a closed cell proportion of 50-90% determined according to ASTM D6226-2010 Standard Test Method. The polyurethane foam is formed by applying a polyurethane composition into the gaps in situ. A process for producing a polyurethane composite element is also described.

3 Claims, No Drawings

POLYURETHANE COMPOSITE ELEMENTS AND PROCESSES FOR PRODUCING THE SAME

CROSS-REFERENCE TO RELATED APPLICATIONS

This application claims priority to Chinese Patent Application No. 201510613870.0, which was filed on Sep. 15, 2015.

TECHNICAL FIELD

One aspect of the present invention relates to a polyurethane composite element comprising one or more gaps containing a polyurethane foam. The polyurethane foam is formed by applying a polyurethane composition into the gaps in situ. Another aspect of the present invention relates to a process for producing the polyurethane composite element.

BACKGROUND ART

A hot melt adhesive comprises an EVA resin and is widely used in the fields of household appliances and the like. A hot melt adhesive base EVA resin is formed from the copolymerization of ethylene and vinyl acetate at high temperature and high pressure. Hot melt adhesive comprising an EVA resin is usually in a solid state at ambient temperatures and will melt into a liquid state at higher temperatures. Hot melt adhesives in a liquid state can be cast into the gaps of products such as appliances where the adhesive composition is cooled, solidified, and cured, thereby functioning as a sealing composition.

A one-component polyurethane foam (OCF) is a product combining aerosol technology and polyurethane foam technology. OCF is a special polyurethane-based product in which a pressure-resistant aerosol can is filled with the components of the OCF such as polyurethane prepolymer, foaming agent, catalyst, and the like. When the materials are ejected from the aerosol can, the components will produce a foaming polyurethane material that rapidly expands and comes into contact with air and/or moisture on contacted substrates, initiating curing reactions, and thereby producing a sealing effect.

There is a need for a two-component polyurethane foam, a process for producing a two-component polyurethane foam, and methods for using a two-component polyurethane foam for sealing applications.

SUMMARY OF THE INVENTION

One aspect of the present invention provides a polyurethane composite element comprising one or more gaps, wherein the one or more gaps contain, and may be filled with, a polyurethane foam having a density of 16-40 kg/m$^3$ and a closed cell proportion of 50-90% determined according to ASTM D6226-2010: Standard Test Method for Open Cell Content of Rigid Cellular Plastics, which is incorporated by reference into this specification. The polyurethane foam is formed by applying a polyurethane composition into the gaps in situ, wherein the polyurethane composition comprises:
A) an isocyanate component comprising one or more organic polyisocyanates; and
B) an isocyanate-reactive component comprising:
 b1) one or more polyether polyols having a hydroxyl value of 200-500 mgKOH/g and a functionality of 2-6;
 b2) one or more foaming agents; and
 b3) a siloxane foam stabilizer in an amount of 0.1-2% by weight, based on total weight of the polyurethane composition.

In a preferred example of the present invention, the foaming agent comprises water.

In another preferred example of the present invention, the polyurethane composition comprises the foaming agent in an amount of 5-10% by weight, based on total weight of the polyurethane composition.

In still another preferred example of the present invention, the polyurethane composition has a rising time of 6-12 seconds.

In yet another preferred example of the present invention, the polyurethane composite element comprises a: tank body of a refrigerator, door body of a refrigerator, door body and/or tank body of refrigeration or insulation equipment, tank body of a refrigeration vehicle, tank body of a refrigeration container, insulation element of a refrigeration unit, building insulation board, or polyurethane insulation pipe.

Another aspect of the present invention provides a process for producing a polyurethane composite element comprising steps of:
 i) providing one or more gaps;
 ii) applying a polyurethane composition into the gaps, wherein a polyurethane foam is formed from the polyurethane composition to fill the gaps, and the polyurethane foam has a density of 16-40 kg/m$^3$ and a closed cell proportion of 50-90% determined according to ASTM D6226-2010 Standard Test Method, and
 wherein the polyurethane composition comprises:
A) an isocyanate component comprising one or more organic polyisocyanates; and
B) an isocyanate-reactive component comprising:
 b1) one or more polyether polyols having a hydroxyl value of 200-500 mgKOH/g and a functionality of 2-6;
 b2) one or more foaming agents; and
 b3) a siloxane foam stabilizer in an amount of 0.1 to 2% by weight, based on total weight of the polyurethane composition.

In a preferred example of the present invention, the foaming agent comprises water.

In another preferred example of the present invention, the polyurethane composition comprises the foaming agent in an amount of 5-10% by weight, based on total weight of the polyurethane composition.

In still another preferred example of the present invention, the polyurethane composition has a rising time of 6-12 seconds.

In yet another preferred example of the present invention, the polyurethane composite element comprises a: tank body of a refrigerator, door body of a refrigerator, door body and/or tank body of refrigeration or insulation equipment, tank body of a refrigeration vehicle, tank body of a refrigeration container, insulation element of a refrigeration unit, building insulation board, or polyurethane insulation pipe.

DETAILED DESCRIPTION

The present invention provides a polyurethane composite element sealed with polyurethane foam. The polyurethane composite element is produced by applying a polyurethane composition into the gaps of the composite element in situ.

The polyurethane composition applied into the gaps foams and cures in situ, thereby forming a polyurethane foam that seals the gaps. The polyurethane foam has a density of 16-40 kg/m$^3$ and a closed cell proportion of 50-90% determined according to ASTM D6226-2010 Standard Test Method. The polyurethane composition comprises:

A) an isocyanate component comprising one or more organic polyisocyanates; and

B) an isocyanate-reactive component comprising:
  b1) one or more polyether polyols having a hydroxyl value of 200-500 mgKOH/g and a functionality of 2-6;
  b2) one or more foaming agents; and
  b3) a siloxane foam stabilizer in an amount of 0.1-2% by weight, based on total weight of the polyurethane composition.

The polyurethane foam has good toughness and adhesion as compared to a hot melt adhesive, and because the polyurethane foam has the property of air-permeability without the leakage of the materials, it can also provide pressure relief capability to articles comprising the polyurethane foam.

Organic polyisocyanates of component A) that may be used for the preparation of polyurethane foam include organic diisocyanates, which may be any known aliphatic, cycloaliphatic, or aromatic isocyanate used for the preparation of polyurethanes. Examples include, but are not limited to: 2,2'-, 2,4- and 4,4'-diphenyl methane diisocyanate; a mixture of monomeric diphenyl methane diisocyanate and polycyclic diphenyl methane diisocyanate homologues (polymeric MDI); isophorone diisocyanate (IPDI) or oligomers thereof; toluene diisocyanate (TDI), such as toluene diisocyanate isomers including toluene-2,4- or 2,6-diisocyanate, or mixtures thereof; tetramethylene diisocyanate or oligomers thereof; hexamethylene diisocyanate (HDI) or oligomers thereof; naphthalene diisocyanate (NDI); or mixtures of any thereof.

In an example of the present invention, the organic polyisocyanates include isocyanates based on diphenyl methane diisocyanate, preferably polyisocyanates comprising polymeric MDI. The functionality of the organic polyisocyanate is preferably 1.9-3.5, and more preferably 2.0-2.8. The viscosity of the organic polyisocyanate is preferably 5 to 600 mPas, and more preferably 10-300 mPas, determined according to DIN 53019-1-3 at 25° C. The polyurethane composition may comprise the isocyanate component A) in an amount of 30-60% by weight, based on total weight of the polyurethane composition.

Organic polyisocyanates may also be used in the form of polyisocyanate prepolymers. Polyisocyanate prepolymers may be obtained by reacting an excess amount of the aforementioned organic polyisocyanates with a compound having at least two isocyanate-reactive groups at a temperature of, for example, 30 to 100° C., preferably about 80° C. The isocyanate (—NCO) content of the polyisocyanate prepolymer used in the polyurethane composition of the present invention can preferably comprise 20 to 33% by weight, and more preferably 25 to 32% by weight, based on total weight of the polyurethane composition. Compounds having at least two isocyanate-reactive groups are well known to those skilled in the art and include, for example, the compounds described in Chapter 3.1 of *"Plastics Handbook"* ("Kunststoffhandbuch, 7, Polyurethanes", Carl Hanser-Verlag, 3$^{rd}$ edition, 1993).

In the present invention, the polyether polyol that may be used as component b1) may have a hydroxyl value of 200 to 500 mgKOH/g, preferably 250 to 350 mgKOH/g, and a functionality of 2-6, preferably 3.9-5.30. The polyurethane composition may comprise the polyether polyol in an amount of 30-90% by weight, based on total weight of the polyurethane composition.

The polyether polyol may be prepared by known processes, for example, prepared by reacting an olefin oxide with an initiator in the presence of a catalyst. The catalyst preferably comprises, but is not limited to, alkaline hydroxide, alkaline alkoxide, antimony pentachloride, boron fluoride etherate, or a mixture of any thereof. The olefin oxide preferably comprises, but is not limited to, tetrahydrofuran, ethylene oxide, propylene oxide, 1,2-butylene oxide, 2,3-butylene oxide, styrene oxide, or a mixture of any thereof. The olefin oxide most preferably comprises ethylene oxide and/or propylene oxide. The initiator preferably comprises, but is not limited to, a polyhydroxy compound and/or polyamine compound. The polyhydroxy compound, when used, preferably comprises, but is not limited to, water, ethylene glycol, 1,2-propanediol, 1,3-propanediol, diethylene glycol, trimethylolpropane, glycerol, bisphenol A, bisphenol S, or a mixture of any thereof. The polyamine compound, when used, preferably comprises, but is not limited to, ethylene diamine, propylene diamine, butylene diamine, hexamethylene diamine, diethylenetriamine, tolylenediamine, or a mixture of any thereof. The polyether polyol may also be an unsaturated polyether polyol.

The polyurethane composition that may be used in the present invention may further comprises a foaming agent, the foaming agent may comprise a variety of physical foaming agents and/or chemical foaming agents. The foaming agent preferably comprises, but is not limited to, water, halogenated hydrocarbons, hydrocarbon compounds, or gases, or mixtures of any thereof. The halogenated hydrocarbon, when used, preferably comprises, but is not limited to, monochlorodifluoromethane, dichloromonofluoromethane, dichlorofluoromethane, trichlorofluoromethane, or a mixture of any thereof. The hydrocarbon compound, when used, preferably comprises, but is not limited to, butane, pentane, cyclopentane, hexane, cyclohexane, heptane, or a mixture of any thereof. The gas, when used, preferably comprises, but is not limited to, air, $CO_2$, or $N_2$.

The foaming agent most preferably comprises water, and in a preferred example of the present invention, the polyurethane composition comprises water in an amount of 2-30%, preferably 5-10%, by weight, based on the weight of the polyurethane composition.

The polyurethane composition that may be used in the present invention further comprises a siloxane foam stabilizer b3). The polyurethane composition may comprise the foam stabilizer in an amount of about 0.1-2% by weight, based on total weight of the polyurethane composition.

The polyurethane composition that may be used in the present invention may further comprise a catalyst. The catalyst preferably comprises, but is not limited to, amine catalyst, organic metal catalyst, or a mixture thereof. The amine catalyst, when used, preferably comprises, but is not limited to, triethylamine, tributylamine, triethylenediamine, N-ethyl morpholine, N,N,N',N'-tetramethyl-ethylene diamine, pentamethyldiethylenetriamine, N,N-methylaniline, N,N-dimethylaniline, or a mixture of any thereof. The organic metal catalyst, when used, preferably comprises, but is not limited to, an organic tin compound, for example: tin(II) acetate, tin(II) octylate, tin ethylhexanoate, tin laurate, dibutyl tin oxide, dibutyl tin dichloride, dibutyl tin diacetate, dibutyl tin maleate, dioctyl tin diacetate, or a mixture of any thereof. The polyurethane composition may comprise the catalyst in an amount of 0.001-10% by weight, based on the weight of the isocyanate-reactive component.

According to the specific requirements, a person skilled in the art may also add other ingredients into the polyurethane composition, including, for example, but not limited to: cell-opening agents, anti-aging agents, pigments, and other additives.

The weight ratio of the isocyanate component A) to the isocyanate-reactive component B) in the polyurethane composition is determined by isocyanate (NCO) index X, wherein X is less than 100, preferably less than 80, and wherein the NCO index X is defined by the following formula:

$$X\ (\%) = \frac{\left[\begin{array}{c}\text{The mole number of the isocyanate}\\ \text{group (NCO group) in component } A\end{array}\right]}{\left[\begin{array}{c}\text{The mole number of the isocyanate--}\\ \text{reactive group in component } B\end{array}\right]} \times 100\%$$

In some examples of the present application, the polyurethane composite element refers to a composite element comprising the aforementioned sealing polyurethane foam located in gaps in a tank body of a refrigerator, door body of a refrigerator, door body and/or tank body of refrigeration or insulation equipment, tank body of a refrigeration vehicle, tank body of a refrigeration container, insulation element of a refrigeration unit, building insulation board, or polyurethane insulation pipe.

Another aspect of the present invention provides a process for producing a polyurethane composite element comprising steps of:

i) providing one or more gaps;

ii) applying the polyurethane composition into the gaps, wherein a polyurethane foam is formed from the polyurethane composition to fill the gaps, and the polyurethane foam has a density of 16-40 kg/m³ and a closed cell proportion of 50-90% determined according to ASTM D6226-2010 Standard Test Method.

In some examples, the gap is a space having a sectional aspect ratio of greater than 20, which may have a regular or irregular shape.

EXAMPLES

The present invention is further illustrated with the following specific Examples. However, those skilled in the art will understand that these examples are only used for the illustration of the present invention, and are not intended to limit the scope of the present invention.

Commercially available products used in the Examples include the following:

N210, a polyether polyol, available from GPRO Group Zhongshan Chemical Plant, having a hydroxyl value of 100, a viscosity of 160, and a functionality of 2.0;

GB3 80, a polyether polyol, available from Shanghai Gao Qiao Petrochemical Corporation, having a hydroxyl value of 380, a viscosity of 12,000, and a functionality of 5.8;

AK-8805, a foam stabilizer, having an organic silicon content of 45-55% by weight, available from Jiangsu Maysta Chemical Co., LTD;

Dabco BL11, a polyurethane synthetic catalyst, available from Air Products and Chemicals (China) Co., Ltd;

Dabaco PC 8, a polyurethane synthetic catalyst, available from Air Products and Chemicals (China) Co., Ltd;

Desomdur® 44v20L, an isocyanate, having a NCO content of 31.5% by weight, available from Covestro (China) Co., Ltd., formally Bayer MaterialScience (China) Co., Ltd.;

Plates were selected to assemble the body shell of a refrigerator. Due to the tolerances of the plates, gaps with a width of about 2 mm were formed in the fit clearances and the bending fit clearances between each plate in the assembled body shell.

The components in Table 1 were mixed through a high-pressure injection gun head, and directly casted to the gaps of the body shell.

TABLE 1

Polyurethane Foam Composition

| Component | Parts by weight |
| --- | --- |
| N210 | 20 |
| GB 380 | 80 |
| AK8805 | 2 |
| Dabaco BL11 | 0.6 |
| Dabaco PC 8 | 1 |
| water | 7.5 |
| 44V20L | 59.25 |

The components foamed and formed a low density polyurethane foam that filled, covered, and sealed the gaps of the body shell. Certain properties of the polyurethane foam are reported in Table 2.

TABLE 2

Polyurethane Foam Properties

| Property | Value |
| --- | --- |
| Rising time | 8.5 seconds |
| Foam breaking time | 39 seconds |
| Core density | 22.0 kg/m³ |
| Adhesion | Good |

The components listed in Table 1 were mixed together and the rising time was measured as the time from end of mixing to the time that the color of the mixed composition suddenly turned white. The foam breaking time refers to the time starting from the end of mixing to the time that the foam cells started to break on the surface of the generated foam. Adhesion was tested by injecting the polyurethane foam onto the articles, waiting for the foam to cure, and manually pulling on the cured foam to evaluate the adhesion. If the foam failed to adhere, the foam had poor adhesion. If the foam was easily removed by manual pulling without any tearing, the foam had medium adhesion. If the foam teared during manual pulling and a portion remained adhered to the article surfaces, the foam had good adhesion.

The invention claimed is:

1. A polyurethane composite element comprising:

one or more gaps, wherein the gaps contain a polyurethane foam having a density of 16-40 kg/m³ and a closed cell proportion of 50-90% determined according to ASTM D6226-2010 Standard Test Method;

wherein the polyurethane foam is formed by applying a polyurethane composition having a rising time of 6-12 seconds and an isocyanate (NCO) index less than 80% into the gaps in situ; and wherein the polyurethane composition comprises:
- A) an isocyanate component comprising one or more organic polyisocyanates having a functionality of 2.0-2.8; and
- B) an isocyanate-reactive component comprising:
  - b1) 30-90% by weight, based on total weight of the polyurethane composition, of one or more polyether polyols having a hydroxyl value of 200-500 mgKOH/g and a functionality of 3.9-5.3;
  - b2) 5-10% by weight, based on total weight of the polyurethane composition, of water; and
  - b3) a siloxane foam stabilizer in an amount of 0.1-2% by weight, based on total weight of the polyurethane composition.

2. The polyurethane composite element according to claim 1, wherein the polyurethane composite element comprises a: tank body of a refrigerator, door body of a refrigerator, door body and/or tank body of refrigeration or insulation equipment, tank body of a refrigeration vehicle, tank body of a refrigeration container, insulation element of a refrigeration unit, building insulation board, or polyurethane insulation pipe.

3. The polyurethane composite element according to claim 1, wherein water is the only foaming agent.

* * * * *